United States Patent [19]

Bisko

[11] 3,735,871
[45] May 29, 1973

[54] FILTER JACKET FOR COOKING OIL

[75] Inventor: Joseph P. Bisko, Pacifica, Calif.

[73] Assignees: John Christopher, Bradley; Edward A. McIntire, Kankakee, Ill.; part interest to each

[22] Filed: Sept. 23, 1970

[21] Appl. No.: 74,717

[52] U.S. Cl. ............... 210/167, 210/238, 210/407, 210/484, 210/489
[51] Int. Cl. ............................................ B01d 25/04
[58] Field of Search.................... 210/167, 407, 484, 210/486, 489, 490, 491, 232, 237, 345, 347, 460, 461, 238

[56] References Cited

UNITED STATES PATENTS

| | | | |
|---|---|---|---|
| 2,760,641 | 8/1956 | Mies, Jr. et al. | 210/489 X |
| 2,399,158 | 4/1946 | Armaly | 210/484 |
| 2,209,180 | 7/1940 | Pentz | 210/484 |
| 3,279,605 | 10/1966 | Shepherd | 210/167 X |
| 1,443,918 | 1/1923 | King | 210/408 |

Primary Examiner—John Adee
Attorney—Clarence A. O'Brien and Harvey B. Jacobson

[57] ABSTRACT

A jacket of cloth for a paper and wire mesh filtering assembly presently employed for cleaning fried food cooking oil which enables cleaning of the filter assembly by scraping the surface of the filter jacket thus prolonging the effective life of the filtering assembly and reducing the time required to clean and replace the filter components.

2 Claims, 2 Drawing Figures

PATENTED MAY 29 1973 3,735,871

Joseph P. Bisko
INVENTOR.

BY Clarence A. O'Brien
and Harvey B. Jacobson
Attorneys

FILTER JACKET FOR COOKING OIL

BACKGROUND OF THE INVENTION

1. Field of the Invention

The present invention generally relates to filtering devices and more particularly a cloth jacket for a paper filter presently employed for use in cleaning cooking oil. The jacket encloses the paper filter and facilitates cleaning of the filter without replacement of the paper filter components thus enabling extended use of the paper filter components before replacement is required.

2. Description of the Prior Art

Many present day commercial establishments which prepare food either for consumption on the premises or for carry out sale employ cooking oil in a deep fat frying operation for cooking various foods such as chicken, shrimp, fish, French fried potatoes and the like. During the cooking operation, the cooking oil receives various particles of food, batter and other impurities which cause the cooking oil to become unclear and impregnated with odors of the foods being cooked. Normally, the cooking oil is cleaned by pumping it through a paper filter assembly to which has been applied a chemical mixture which may be either directly applied to the paper or indirectly placed in the cooking oil. As the cooking oil is pumped through the paper filter, the cooking oil is cleaned and can then be re-used. However, in present day operations, it is necessary to replace the filter paper after a relatively short period of use since it becomes clogged and cannot be cleaned by scraping or the like. Replacement of the paper filter requires that the cleaning operation be shutdown and also requires substantial labor thus increasing the cost of producing the food products. Also, when the paper filter is replaced, the person engaged in this activity is exposed to hot grease and there is a substantial danger of injury.

SUMMARY OF THE INVENTION

It is an object of the present invention to provide a cloth jacket for the paper filter assembly presently employed for filtering cooking oil which filters solid particles from the cooking oil and cleans the cooking oil to a substantial degree prior to its passage through the paper filter with the cloth jacket being cleaned by scraping solid particles and the like off the external surface thereof thereby enabling the filter assembly to be employed over a longer period of operation before it is necessary to replace the paper components thereof thereby reducing the cost of the paper filters, reducing the labor, increasing the sanitation characteristics of the operation by providing a cleaner cooking oil and reducing the hazards which occur when replacing the paper filter components.

Another object of the invention is to provide a filter jacket in accordance with the preceding object in which the jacket is constructed of pocket drill cloth constructed to enclose the paper filter with the cloth having a rough weave surface which should be placed externally and a smooth weave surface which should be placed internally adjacent the paper filter.

Still another object of the invention is to provide a filter jacket capable of being installed on existing filter assemblies without any modification whatsoever to the existing paper filter assembly with the filter jacket being quite simple in construction and easy to assemble with respect to existing filter structures and relatively inexpensive to manufacture.

DESCRIPTION OF THE PREFERRED EMBODIMENT

Figure 1:
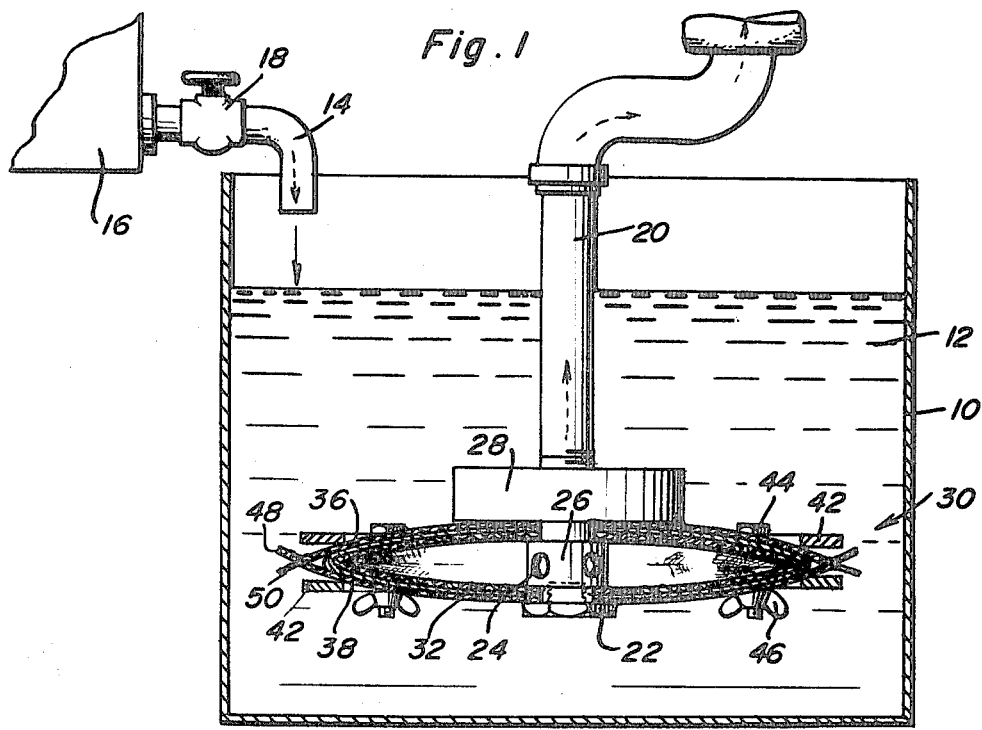
FIG. 1 is a sectional view of the filter assembly illustrating the cloth jacket associated therewith and illustrating the filter assembly schematically in a filtering operation now being employed for cleaning cooking oil.
Figure 2:
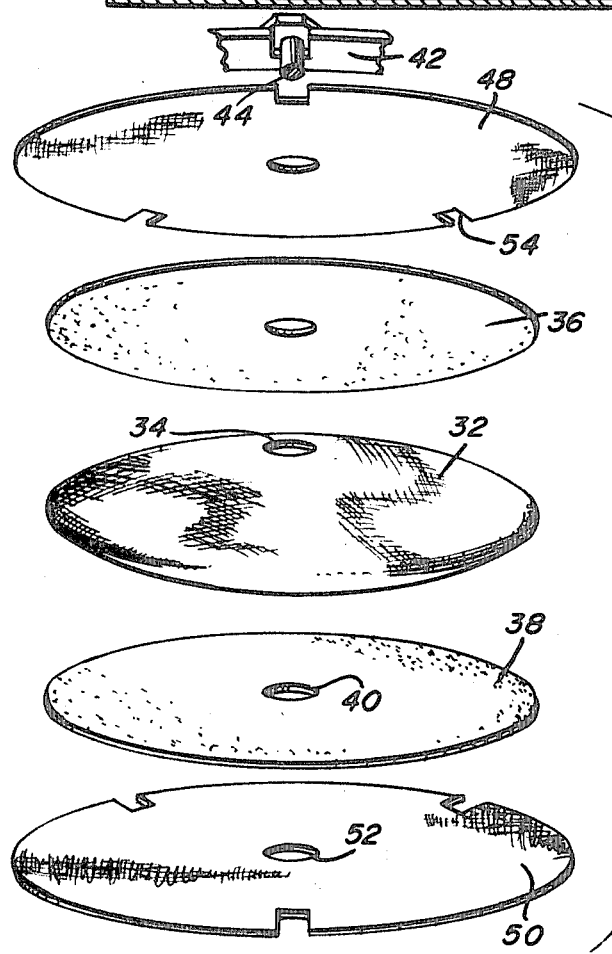
FIG. 2 is an exploded group perspective view of the components of the filter assembly illustrating the relationship thereof.

FIG. 1 illustrates schematically a tank 10 having a quantity of used cooking 12 therein which is received through a suitable pipe 14 communicated with the bottom of a used cooking oil tank 16 with a suitable valve 18 provided in the pipeline 14 to control flow from the tank 16 into the tank 10. A suction pipe 20 extends into the tank 10 and communicates with a pump structure and returns the cleaned cooking oil to a suitable tank. The pipe 20 terminates in spaced relation to the bottom of the tank 10 and includes a closure plug 22 and includes inlet openings 24 therein for admitting cooking oil into the interior of the pipe 20 so that cooking oil will be circulated through the tank 10 in a well known manner. The apertures 24 are provided in a collar 26 on the pipe 20 and communicate with the interior thereof and a collar or coupling 28 max be provided on the pipe 20 to facilitate assembly and disassembly of a filter assembly generally designated by the numeral 30 with the collar or spacer 26 being disposed interiorly of the filter assembly and the collar 28 disposed above the filter assembly.

The existing filter structure presently being employed includes a pair of wire mesh disks 32 having a central aperture 34 receiving the pipe 20 and disposed above and below the spacer 26 with the peripheral edges thereof either connected or separate as desired but in any event, the wire screen or mesh 32 defines a hollow oval-shaped screen member with the apertures 24 being disposed interiorly thereof so that as cooking oil enters the pipe 20, it will pass through the screen 32.

Disposed against the upper and lower surfaces of the screen 32 is a pair of paper disks filters 36 and 38 each having a central aperture 40 therein receiving the pipe 20. The paper disk filters 36 conform in shape and configuration to the surfaces of the screen 32 and are held in clamped relation thereto by upper and lower peripheral clamp rings 42 which engage the outer periphery of the filter disks 36 and 38 and clampingly retain the paper disks 36 and 38 assembled with the mesh screen 32 by the use of clamp bolts 44 and wing nuts 6 which may be of any suitable construction and enable easy disassembly thereof for replacement of the paper filters 36 and 38.

Essentially, the present invention incorporates the addition of a pair of cloth disk filter elements 48 and 50 each having a central aperture 52 therein for receiving the pipe 20 therethrough and each being of substantially the same shape and configuration as the paper disk elements 36 and 38 except that the cloth disk filters 48 and 50 are larger in circumferential extent and extend outwardly beyond the annular clamp rings 42 so that the peripheral edges thereof may be grasped and pulled radially outwardly to retain the cloth disk filters 48 and 50 in a taut condition while the wing nuts and bolts are being tightened to clamp the filter assembly into assembled relation. Each cloth filter disk 48 and 50 includes radial notches 54 in the periphery thereof for receiving the bolts 44 thus enabling the bolts to be disposed interiorly of the peripheral edge of the cloth disk filters 48 and 50. When the cloth disk filters are assembled with respect to the paper disk filters and the screen member 32, the cloth disk filters, in effect, form a jacket for the paper filters and cooking oil passing from the tank 10 through the filter assembly into the interior of the pipe 20 must first pass through either the upper or lower cloth filter disk 48 or 50 and then through the corresponding paper disk filters 36 and 38 and then through the screen 32 and ultimately into the interior of the pipe 2.

The cloth disk filters 48 and 50 constructed of pocket drill cloth or other similar close weave cloth which has a rough coarse weave surface and a smooth fine weave surface and in installing the cloth members 48 and 50, the rough surface should be disposed exteriorly of the filter assembly and the smooth surface disposed interiorly thereof. The cloth filters 48 and 50 will effectively remove hard particles of meat, flour or other coatings which must be filtered out of the cooking oil and the filter assembly with the cloth filter elements is substantially more efficient in the filtering operation than the use of the paper filters only. When using the cloth filter jacket of the present invention, the same additive is employed as presently used which involves the application of a chemical mixture in the form of a slurry to the paper under normal circumstances but in this instance, the same slurry would be applied to the external surface of the cloth rather than to the paper. In some installations, the chemical mixture is added directly to the cooking oil so that it indirectly is applied to the surface of the filter as the cooking oil passes therethrough. In contrast with the present method, where the filter paper cannot be scraped once it becomes clogged so that it must be frequently replaced, the use of the cloth filter jacket of the present invention permits the operator to scrape the external surface of the cloth with any suitable instrument a relatively large number of times prior to the necessity of removal of the filter and replacement of the components. This not only results in a substantial saving in shutdown time but also provides a substantial saving in the cost of the chemical mixture, the cost of the paper filter elements, the cost of labor and provides a more sanitary cooking operation and a safer operation since the operator does not have to come into contact with hot cooking oil as often when employing the present invention as compared with known methods.

The structure which enables the surface of the cloth filter jackets to be maintained in taut condition enables material to be more easily scraped from the surface of the filters. Also, the enlargement of the cloth filter elements enabling the periphery thereof to be grasped provides for stretching or tightening of the cloth filter jacket when the annular metal rings are being tightened which compresses the filter assembly and retains it in assembled condition with the components thereof compressed. The particular details of construction of the annular rings, clamp bolts and other structural features enabling the filtering assembly to be mounted on and removed from the suction pipe 20 may be varied depending upon the particular installation and other conventional components may be provided in the system such as heaters or the like to maintain the cooking oil at a predetermined temperature to facilitate the filtering and cleaning thereof.

Also, the filter assembly including the cloth jackets or filter elements may be of any shape or configuration other than circular, which corresponds with the shape and configuration of the filter with which the cloth filter elements is to be used. In actual practice, the presently used paper filter elements would effectively clean and filter the cooking oil for only a relatively short period of time depending, of course, upon the condition of the cooking oil. In actual practice, the quantity of cooking oil that can be effectively cleaned and filtered by using the cloth filter jackets of the present invention before replacement of the filter components is necessary has been increased by as much as ten times the quantity as compared with the use of conventional paper filters only. The cloth used in the filter is unbleached and undyed thus eliminating any possibility of contamination of the cooking oil with bleaches, dyes or the like.

When using the filter jacket of the present invention in combination with the paper filter and screen, the chemical additive is employed for best results. One additive which is now being used is identified as "Kentucky Fried Chicken Filter Aid" which is distributed by Kentucky Fried Chicken Corporation, Louisville, KY. The chemical composition of the filter aid by weight is as follows:

| | |
|---|---|
| $SiO_2$ | 75% |
| $Al_2O_3$ | 15% |
| $Na_2O$ | 5% |
| $FeO_3$ | 1% |
| CaO & MgO | 1% |
| Total heavy metals | 1% |
| Ignition loss not more than | 2% |

In employing the filter aid, 1 pint is mixed with 1 gallon of cooking oil into a surry with a wire whip or the like. This slurry is placed on the filter in any desired manner with one practical procedure being the pouring of the prepared slurry directly on the filter with the tank 10 filled only one to two inches above the filter with cooking oil and the pump started to circulate shortening in the "polishing" tank. This will result in the slurry being applied directly to the filter which precoats the filter. The balance of the tank is then filled with cooking oil and the cooking oil is thus cleaned. The slurry can be poured on top of the cloth or used in the cooking oil although it is usually preferable to pour or otherwise coat the cloth filter jacket directly. In actual practice, the saving in the "Filter Aid" is approximately 90 percent when the slurry is poured directly onto the cloth. The pressure of the cooking oil will hold the "Filter Aid" on the cloth as the oil passes therethrough and it can be readily removed when the cloth becomes clogged with "fines." This eliminates circulation of the "Filter Aid" with the cooking oil through the system thus avoiding a tendency of the "Filter Aid" discoloring the cooking oil as it circulates through the cooking tanks. The cloth is relatively inexpensive but sufficiently strong, heat resistant, loosely woven and unbleached so that it will not adversely affect the cooking oil but will effectively filter the oil and prolong the useful life of the paper filters.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a food cooking apparatus employing cooking oil in which particles of food, food coatings and the like become deposited and which is disposed in a container and capable of circulation in a flow path having an intake in the container, a cleaner assembly immersed in the cooking oil in the container and interposed in the flow path of the cooking oil, said cleaner assembly including a screen member disposed in the flow path of the cooking oil, said screen member including a top and bottom member of mesh material having the peripheral edges engaged with each other and the central portions spaced apart to form a hollow interior with the intake of the flow path for the cooking oil being disposed in the hollow interior for causing cooking oil to flow from the exterior to the interior of the screen member when entering the flow path, paper filter elements disposed in the flow path and completely covering and engaging the exterior surface of the screen member for removing material from the cooking oil as it passes into the hollow interior of the screen member and being subject to clogging thereby thus requiring frequent replacement of the paper filter elements inasmuch as the paper filter elements are incapable of withstanding abrasive action of scraping material from the exterior surface thereof, that improvement comprising a cloth member disposed against and completely covering the exterior surface of each paper filter element to collect particles from the cooking oil as it enters the hollow interior of the screen member, said cloth being characterized by an exterior surface capable of frequent and repeated scraping of particles and other material therefrom without removal from the container and flow path and without disturbing the screen member and paper filter elements thereby materially extending the time that the paper filter elements can be used before replacement, said top and bottom mesh members and paper filter elements being generally in the form of circular discs, a pair of annular rings engaged with the peripheral edge of the discs, means clamping the rings together thereby clamping the discs together for retaining the top and bottom mesh members and top and bottom paper filter elements in assembled relation, said cloth including a top and bottom generally disc-like member having a diameter greater than the top and bottom mesh members and the top and bottom paper filter elements and the rings with the periphery of the cloth disc-like members extending beyond the periphery of the rings to provide a peripheral area on each of the cloth disc-like members beyond the periphery of the rings to enable the cloth disc-like members to be grasped and stretched taut as the clamping means for the rings are actuated thereby retaining the cloth disc-like members substantially wrinkle-free to facilitate scraping of particles and other material from the exterior surfaces thereof.

2. The combination as defined in claim 1 wherein each of the cloth disc-like members includes a rough exterior surface facilitating the scraping of particles and other material from the exterior surface of the cloth disc-like members, said means clamping the annular rings together including bolt type fasteners extending therebetween and disposed peripherally outwardly of the top and bottom mesh members and the paper filter elements, each of said cloth members having radially disposed notches extending inwardly from the periphery thereof for receiving said bolt type fasteners.

* * * * *